US012739604B2

(12) United States Patent
Mourad et al.

(10) Patent No.: US 12,739,604 B2
(45) Date of Patent: Sep. 15, 2026

(54) METHOD AND APPARATUS FOR DEFINING CONNECTION PARAMETERS OF VEHICLE COMMUNICATIONS CONNECTIONS

(71) Applicant: Bayerische Motoren Werke Aktiengesellschaft, Munich (DE)

(72) Inventors: Alaa Mourad, Munich (DE); Thomas Wursthorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 293 days.

(21) Appl. No.: 18/425,653

(22) Filed: Jan. 29, 2024

(65) Prior Publication Data

US 2024/0292195 A1 Aug. 29, 2024

(30) Foreign Application Priority Data

Feb. 28, 2023 (DE) ..................... 10 2023 104 931.3

(51) Int. Cl.
*H04W 4/12* (2009.01)
*H04W 4/40* (2018.01)

(52) U.S. Cl.
CPC ............... *H04W 4/40* (2018.02); *H04W 4/12* (2013.01)

(58) Field of Classification Search
CPC ........... H04W 4/40; H04W 4/12; H04W 4/80; H04W 76/11
See application file for complete search history.

(56) References Cited

U.S. PATENT DOCUMENTS

2014/0018000 A1 1/2014 Seymour et al.
2020/0029209 A1* 1/2020 Nölscher ............. H04W 12/069
2021/0197762 A1* 7/2021 Abiakle Kai .......... G08G 1/017
2021/0243274 A1* 8/2021 Thomas .................. H04W 4/40
2022/0153231 A1* 5/2022 Brückner .............. H04W 4/023

FOREIGN PATENT DOCUMENTS

DE 10 2013 212 941 A1 1/2014
DE 10 2017 102 620 A1 8/2018
DE 10 2018 206 785 A1 11/2019
DE 3580942 A1 * 12/2019 ............ H04W 12/03

OTHER PUBLICATIONS

German-language Search Report issued in German Application No. 10 2023 104 931.3 dated Oct. 4, 2023 with partial English translation (12 pages).

* cited by examiner

*Primary Examiner* — Lakeram Jangbahadur
(74) *Attorney, Agent, or Firm* — Crowell & Moring LLP

(57) ABSTRACT

Methods, systems, and apparatuses are provided for determining at least one connection parameter of a multiplicity of different communication connections between an electronic device and a corresponding multiplicity of different vehicles. A multiplicity of significance values is determined for a significance of the corresponding multiplicity of different communication connections. The connection parameters of the multiplicity of different communication connections are defined based on the corresponding multiplicity of significance values. A significance message sent by a vehicle is received via a communication connection between the portable electronic device and the vehicle. The significance value is determined for the significance of the communication connection between the portable electronic device and the vehicle based on the significance message.

14 Claims, 3 Drawing Sheets

METHOD AND APPARATUS FOR DEFINING CONNECTION PARAMETERS OF VEHICLE COMMUNICATIONS CONNECTIONS

CROSS REFERENCE TO RELATED APPLICATION

This application claims priority under 35 U.S.C. § 119 from German Patent Application No. 10 2023 104 931.3, filed Feb. 28, 2023, the entire disclosure of which is herein expressly incorporated by reference.

BACKGROUND AND SUMMARY

The present subject matter relates to a method and a corresponding apparatus for remotely controlling one or more vehicle functions of different vehicles by means of a common device.

A vehicle may have one or more functions that can be remotely controlled by a user of the vehicle using an electronic device, such as a smartphone. An example of a vehicle function is the opening and/or closing of a door or flap of the vehicle. The one or more vehicle functions are remotely controlled via a wireless communication connection between the vehicle and the electronic device.

It may be possible for a user to remotely control vehicle functions in different vehicles using an electronic device. For example, it may be possible for the operator of a fleet to remotely control functions in different vehicles in the fleet using a single electronic device.

The present document deals with the technical object of enabling particularly efficient, reliable and convenient remote control of vehicle functions in different vehicles.

One aspect describes an apparatus for determining, in particular for defining, at least one connection parameter of a multiplicity of different communication connections between an electronic device and a corresponding multiplicity of different (motor) vehicles (in particular, respectively, automobiles or trucks or buses or motorcycles).

The individual communication connections of the multiplicity of communication connections can each include, in particular be, a Bluetooth Low Energy (BLE) communication connection. The connection parameter to be determined for the individual communication connections may comprise, in particular be, the temporal length of connection intervals of the respective BLE communication connection.

The individual communication connections between the device and the individual vehicles may have each been established considering a digital key. The digital key may be designed according to a Car Connectivity Consortium, CCC, key standard, in particular according to CCC Release 3. The digital key may be designed to enable the device to control one or more vehicle functions of the respective vehicle.

The apparatus can thus be configured to remotely control one or more vehicle functions of a vehicle via the (BLE) communication connection between the device and the respective vehicle. Examples of vehicle functions are the opening and/or closing of a vehicle door and/or the starting and/or stopping of the drive motor of the vehicle and/or the automated and/or remotely controlled parking of the vehicle.

The apparatus is configured to determine a multiplicity of significance values for the significance of the corresponding multiplicity of different communication connections. The significance value for the significance of a communication connection can indicate the priority of the communication connection, in particular in comparison with one or more other communication connections of the multiplicity of communication connections. The significance value for the significance of a communication connection can be determined on the basis of a user input and/or on the basis of a significance message transmitted via the communication connection.

The apparatus is further configured to determine, in particular to define, the connection parameters of the multiplicity of different communication connections on the basis of the corresponding multiplicity of significance values.

The device can have a limited amount of total resources for communicating with the multiplicity of vehicles. The connection parameters can be determined in such a way that the respective proportion of the total resources of the individual communication connections increases with increasing significance and/or decreases with decreasing significance.

As already explained further above, the connection parameter may comprise, in particular be, the temporal length of connection intervals of the individual BLE communication connections. The temporal length of connection intervals can be determined in such a way that

- the temporal length of a (any) first communication connection is less than the temporal length of a (any) second communication connection when the multiplicity of significance values indicate a higher significance of the first communication connection than the second communication connection; and/or
- the temporal length of a (any) first communication connection is greater than the temporal length of a (any) second communication connection when the multiplicity of significance values indicate a lower significance of the first communication connection than
- the second communication connection; and/or the temporal length of connection intervals of the individual communication connections decreases with increasing significance and/or increases with decreasing significance.

Determining and considering significance values for the individual communication connections may enable particularly efficient, reliable and convenient remote control of vehicle functions of different vehicles by means of a single key device.

The apparatus may be configured to determine, in particular to receive, a significance message sent by a vehicle via the respective communication connection between the device and the vehicle. Significance messages that have been sent by the individual vehicles of the multiplicity of vehicles can be determined, in particular received, in a corresponding manner.

The significance value for the significance of the respective communication connection between the device and the respective vehicle can then be determined in a robust and precise manner on the basis of the respective significance message. The individual significance messages can each indicate a priority level from a predefined set of different priority levels (e.g. low priority, medium priority and/or high priority).

It can thus be possible for the individual vehicles (even for a communication connection that already exists) to send a significance message to the device in order to indicate the significance of the communication connection (desired by the vehicle) to the device. This allows the significance values to be determined in a particularly efficient, robust and flexible way. In this case, it may be possible for the individual vehicles to repeatedly send updated significance messages with updated significance values during the existence of a communication connection, which can then be used by the apparatus to update the connection parameter for the multiplicity of communication connections.

The significance messages sent by the individual vehicles are each preferably messages according to the CCC standard or protocol. Alternatively, or additionally, a significance message can be sent on the same protocol layer (e.g. on the application layer) as the digital key. In addition, a significance message can be sent on a different protocol layer, in particular on a (logically) higher protocol layer (according to the OSI model), than the protocol layer used for the respective (BLE) communication connection. This enables particularly robust and flexible remote control of a vehicle function.

The apparatus may be configured to determine the significance value for the significance of the communication connection between the device and a vehicle on the basis of a user input on the device. The device may have, for example, a user interface (e.g. with a graphical user interface) which allows the user of the device to define a significance value (in particular a priority or a priority level) for each of the multiplicity of communication connections by means of a user input. The significance values for the significance of the multiplicity of communication connections can then be determined in a particularly flexible and convenient manner on the basis of the user input on the user interface of the device.

Alternatively, or additionally, the significance value for a communication connection can depend on the vehicle function that is intended to be controlled via the communication connection. For this purpose, the apparatus may be configured (e.g. on the basis of a user input) to determine the vehicle function of a vehicle that is to intended to be remotely controlled via the communication connection between the device and a vehicle. The significance value for the significance of the communication connection between the device and the vehicle can then be determined in a precise manner on the basis of the vehicle function (in particular on the basis of a latency requirement of the vehicle function) that is intended to be remotely controlled via the communication connection. A predefined significance catalog which indicates a respective corresponding significance value for different vehicle functions can be considered. In a corresponding manner, the significance values for the multiplicity of communication connections can be determined on the basis of the respective vehicle function.

The apparatus may be configured, repeatedly, at successive times, in each case to determine an updated multiplicity of significance values (wherein the significance values for one or more communication connections have been updated, if necessary). The updated multiplicity of significance values can be determined, for example, on the basis of a user input and/or on the basis of a received significance message and/or on the basis of a (changed) vehicle function.

The apparatus may also be configured to update, in particular to adjust, the connection parameters of one or more of the multiplicity of communication connections based on the updated multiplicity of significance values. Repeatedly updating the significance values and the connection parameters makes it possible to permanently increase the quality of the remote control of vehicle functions.

The apparatus may be configured to detect an additional communication connection between the device and an additional vehicle (in addition to the already existing multiplicity of communication connections). Furthermore, a significance value for the significance of the additional communication connection can be determined (based on one or more of the information sources described in this document).

On the basis of the multiplicity of significance values for the corresponding multiplicity of communication connections and on the basis of the significance value for the additional communication connection,

- the connection parameters of one or more of the multiplicity of different communication connections can then be adjusted; and/or
- the connection parameter of the additional communication connection can be determined, in particular defined.

The detection of an additional communication connection can therefore lead to a change in connection parameters of one or more already existing communication connections. In this way, the total resources of the device can be distributed in a particularly precise manner across the different communication connections in order to further increase the quality of the remote control of vehicle functions.

The apparatus may be configured to identify that at least one of the multiplicity of communication connections no longer exists, resulting in a reduced amount of communication connections (without the communication connection that no longer exists) and a corresponding reduced amount of significance values. The connection parameters of one or more of the reduced amount of communication connections can then be adjusted based on the corresponding reduced amount of significance values.

Identifying a communication connection that no longer exists can therefore lead to a change in connection parameters of one or more communication connections that still exist. In this way, the total resources of the device can be distributed in a particularly precise manner across the different communication connections in order to further increase the quality of the remote control of vehicle functions.

As explained further above, it may be possible for a vehicle (e.g. by sending a significance message) to define a priority. If necessary, the priority can be associated with the digital key for the vehicle. In particular, the device may associate the digital key of the vehicle with a certain priority level. Accordingly, the digital keys of the multiplicity of vehicles can each be associated with a priority level. These priority levels can be stored together with the individual digital keys (on the device).

The connection parameters of the individual communication connections can then be defined based on the priority levels of the digital keys of the corresponding vehicles. In particular, the significance values can be determined on the basis of the priority levels associated with the respective digital key (and, if necessary, stored in the storage unit). This allows the quality of the remote control to be further increased.

A further aspect describes a (mobile and/or electronic) user device (e.g. a smartphone or generally a smart device) for a user of a multiplicity of motor vehicles. The user device may in each case have a digital key for an access system of the individual motor vehicles (wherein the individual digital keys are each stored, for example, in a secure memory of the user device). In addition, the user device may comprise the apparatus described in this document.

A further aspect describes a method for determining at least one connection parameter (in particular the connection interval) of a multiplicity of different (BLE) communication connections between an electronic (key) device and a corresponding multiplicity of different (motor) vehicles.

The method comprises determining a multiplicity of significance values for the significance (in particular for the priority or the priority level and/or for the significance or importance) of the corresponding multiplicity of different communication connections. Furthermore, the method comprises determining, in particular defining, the connection parameters of the multiplicity of different communication connections on the basis of the corresponding multiplicity of significance values.

Another aspect describes a software (SW) program. The SW program can be configured to be executed on a processor and to thereby carry out the method described in this document.

Another aspect describes a non-transitory computer-readable storage medium. The storage medium may comprise an SW program that is configured to be executed on a processor and to thereby carry out the method described in this document.

It should be noted that the methods, apparatuses and systems described in this document may be used both on their own and in combination with other methods, apparatuses and systems described in this document. Furthermore, any aspects of the methods, apparatuses and systems described in this document may be combined with one another in a wide variety of ways. The features of the claims may in particular be combined with one another in a wide variety of ways. Furthermore, features in parentheses are to be understood as optional features.

As explained at the outset, the present document deals with increasing the energy efficiency and/or reliability of the remote control of vehicle functions in different vehicles using a single key device.

DETAILED DESCRIPTION OF THE DRAWINGS

Figure 1A:
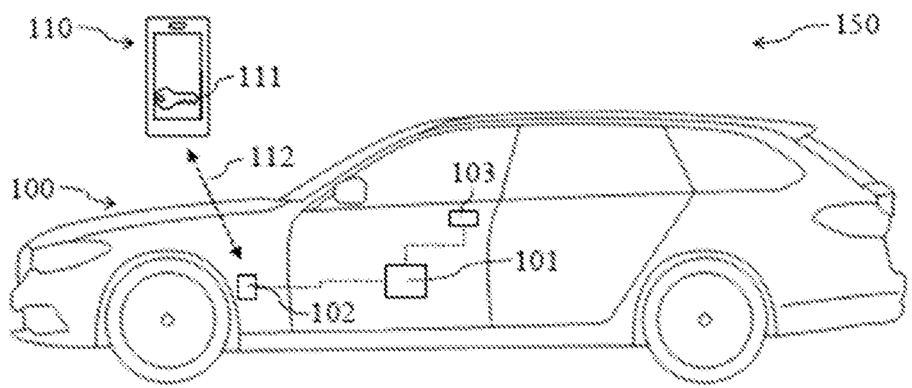
FIG. 1*a* shows an exemplary digital access system of a vehicle.

FIG. 1*a* shows an exemplary (access) system 150 which comprises at least one vehicle 100 and a digital key device 110. The digital key device 110 is typically a portable electronic device, such as a smartphone or a tablet PC, wherein a digital key 111 is stored on the portable electronic device. The digital key 111 may be stored in a protected memory area, in particular in a so-called "secure element", of the portable electronic device (such as the user device).

The digital key device 110 is designed to communicate with a communication unit 102 of the vehicle 100 via one or more different wireless communication connections 112. The different communication connections 112 can be used for different purposes. In particular, a Bluetooth Low Energy (BLE) communication connection 112 can be used to

- determine the distance and/or relative position between the digital key device 110 and the vehicle 100 (in particular on the basis of the signal strength, in particular the RSSI (Received Signal Strength Indicator), of the radio signals interchanged between the vehicle 100 and the device 110; and/or using BLE channel sounding (mode 2/phase-based measurements); and/or
- interchange data between the digital key device 110 and the vehicle 100 (for example a control command for controlling a vehicle function 103, such as the unlocking of a door and/or the opening or closing of a window and/or the activation or deactivation of a heating function and/or the activation or deactivation of the drive motor of the vehicle 100).

Alternatively, or additionally, an ultra-wideband (UWB) communication connection 112 can be used to determine the position of the device 110 relative to the vehicle 100 with a relatively high degree of accuracy. Determining the position of the device 110 using the UWB communication connection 112 can be referred to as UWB ranging.

Figure 1B:
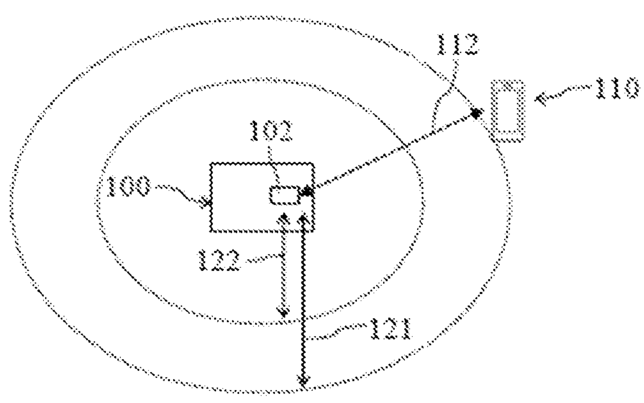
FIG. 1*b* shows an exemplary usage situation for a digital access system.

A (control) apparatus 101 of the vehicle 100 may be designed to control at least one vehicle function 103 of the vehicle 100 depending on the communication between the device 110 and the vehicle 100, as illustrated in FIG. 1*b*. In this context, the digital key 111 of the device 110 can be verified, in particular authenticated. Furthermore, after successful authentication, one or more vehicle functions 103 can be controlled, in particular depending on

- the distance between the device 110 and the vehicle 100;
- the position of the device 110 relative to the vehicle 100; and/or
- a control command that is sent from the device 110 to the vehicle 100 via a communication connection 112.

In an exemplary system 150, a BLE communication connection can be established 112 between the device 110 and the vehicle 100 as soon as the distance between the device 110 and the vehicle 100 is equal to or less than a first distance threshold value 121. This allows the user to remotely control one or more vehicle functions 103 using the device 110. Typically, the vehicle 100 indicates the availability of a BLE communication connection 112 repeatedly, e.g. at a certain frequency. From the first distance threshold value 121, the device 110 (which may also be referred to as "user equipment" (UE)) receives the indicator message from the vehicle 100 and the BLE communication connection 112 can then be established between the device 110 and the vehicle 100. The first distance threshold value 121 may depend on the communication capabilities of the device 110, the environment of the vehicle 100 and/or the device 110, and/or the position of the device 110 relative to the vehicle 100.

Furthermore, a UWB communication connection 112 can be established between the device 110 and the vehicle 100 as soon as the distance between the device 110 and the vehicle 100 is equal to or less than a second distance threshold value 122 (which may be less than the first distance threshold value 121 and/or which may depend on the communication capabilities of the device 110). Based on the UWB communication connection 112, the location of the device 110 can be determined with a relatively high degree of accuracy. One or more additional vehicle functions 103 can possibly be controlled via the UWB communication connection 112 (in addition to one or more functions 103 which can be controlled via the BLE communication connection 112).

Figure 2A:
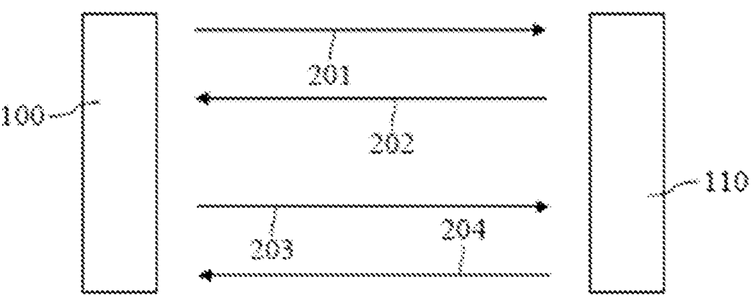
FIG. 2*a* shows exemplary messages between a vehicle and a digital key device.

FIG. 2*a* illustrates the (possibly repeated, in particular periodic) sending of an indicator message 201 by the vehicle 100 in order to indicate that a (BLE) communication connection 112 to the vehicle 100 can be established. FIG. 2 further shows a response message 202 which is sent from the device 110 to the vehicle 100 in response to the receipt of an indicator message 201 in order to establish the communication connection 112.

Following the establishment of the (BLE) communication connection 112, messages 203, 204 can be interchanged between the vehicle 100 and the device 110 via the communication connection 112, e.g. in order to remotely control a vehicle function 103. The messages 203, 204 are transmitted in so-called "connection events", where the connection events may have a certain time limit. Between directly successive "connection events" there is typically a so-called "connection interval", in which no messages 203, 204 can be interchanged between the vehicle 100 and the device 110. The insertion of connection intervals between connection events typically leads to a reduction in the energy consumption of the communication between the vehicle 100 and the device 110, since the vehicle 100 and/or the device 110 can switch to an energy-saving mode in the individual connection intervals (since the receipt of a message 203, 204 is not expected in the individual connection intervals).

Figure 2B:
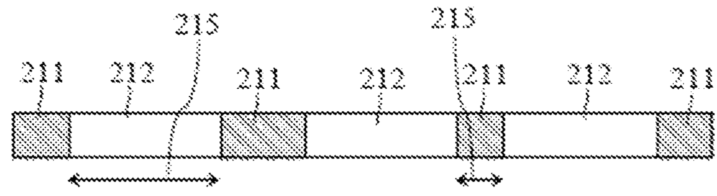
FIG. 2*b* shows an exemplary sequence of connection events and connection intervals.

FIG. 2*b* illustrates a temporal sequence of connection events 211 (for transmitting messages 203, 204) and connection intervals 212 (for reducing the energy consumption). The temporal length 215 of the individual connection intervals 212 can be defined (if necessary while establishing the communication connection 112 between the vehicle 100 and the device 110). The length 215 can be, for example, between 7.5 ms and 4 s, possibly 30 ms as standard. In this case, a shortening of the connection intervals 212 typically leads to a reduction in the latency of the remote control of a vehicle function 103 (but to an increase in the energy consumption). On the other hand, an extension of the connection intervals 212 typically leads to an increased latency of the remote control of a vehicle function 103, but to a reduction in the energy consumption.

The temporal length 215 of the individual connection events 211 may depend on the amount of data to be transferred in the respective connection event 211. If no control messages 203, 204 are to be transferred, one or more (relatively short) data packets can be transferred in order to allow the vehicle 100 and/or the device 110 to check the continuity of the communication connection 112.

In the context of a (BLE) communication connection 112, one of the two communication partners (typically the device 110) has the status of a so-called "central", and the other communication partner (typically the vehicle 100) has the status of a so-called "peripheral". The one or more connection parameters of the communication connection 112, in particular the length 215 of the connection intervals 212, can be defined by the "central" if necessary.

Figure 3A:
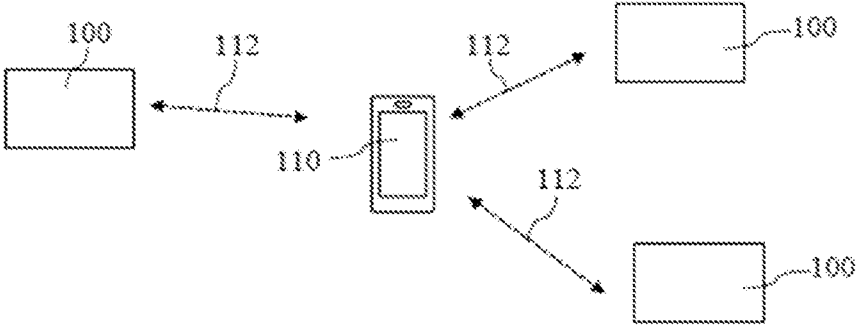
FIG. 3*a* shows an exemplary key device having communication connections to a multiplicity of vehicles.

As illustrated by way of example in FIG. 3*a*, the key device 110 may have a multiplicity of (BLE) communication connections 112 to a corresponding multiplicity of vehicles 100. The device 110 typically has only a single transmitting and/or receiving unit for carrying out the communications via the multiplicity of (BLE) communication connections 112. In other words, the device 110 can have limited total resources for carrying out the multiplicity of communications. This can lead to conflicts between the different communication connections 112. In particular, this can lead to the fact that the temporal lengths 215 of the connection intervals 212 (e.g. 30 ms each) defined for the individual communication connections 112 cannot be adhered to. Alternatively, or additionally, this can lead, according to the order in which the individual communication connections 112 are established, to the temporal length 215 of the connection intervals 212 for the individual communication connections 112 increasing, with the result that a (possibly significantly) greater temporal length 215 is defined for the communication connection 112 established last than for the communication connection 112 established first. This may lead to an impairment of the quality of the remote control of vehicle functions 103 in one or more vehicles 100 which have a communication connection 112 having a relatively great temporal length 215 of the connection intervals 212.

In the context of the communication between a vehicle 100 and the device 110, a significance message 203, 204, which informs the respective other communication partner about the significance (in particular about the priority) of the communication, can be sent from the vehicle 100 to the device 110 and/or from the device 110 to the vehicle 100. The significance of the communication between the vehicle 100 and the device 110 may depend, for example, on the vehicle function 103 which is intended to be remotely controlled via the communication connection 112. In this case, it may be possible to resort to a predefined significance catalog which indicates the significance, in particular the priority, of the respective vehicle function 103 for different vehicle functions 103 in each case.

The temporal length 215 of the connection intervals 212 for the individual communication connections 112 can be defined depending on the significance, in particular priority, determined for the respective communication connection 112. If necessary, this can be done independently of the order in which the individual communication connections 112 are established.

For example, for the first communication connection 112 between the device 110 and a first vehicle 100, a first length 215 for the connection intervals 212 can be defined (e.g. 30 ms). The first length 215 can be dependent on or independent of the significance of the first communication connection 112 (determined on the basis of the one or more significance messages 203, 204).

In the context of establishing an additional, second communication connection 112 between the device 110 and an additional, second vehicle 100, the first significance of the first communication connection 112 and the second significance of the second communication connection 112 (determined on the basis of the one or more significance messages 203, 204) can be compared with each other in order to

- define the second length 215 for the connection intervals 212 of the second communication connection 112; and
- if necessary, change the first length 215 for the connection intervals 212 of the first communication connection 112.

For example, the first length 215 can be increased when the comparison indicates that the second communication connection 112 has a higher second significance than the first significance of the first communication connection 112. On the other hand, a greater second length 215 than the first length 215 can be defined for the second communication connection 112 when the comparison indicates that the second communication connection 112 has a lower second significance than the first significance of the first communication connection 112.

In the current CCC specification for digital vehicle keys 111, the recommended value 215 for the Bluetooth connection interval 212 is 30 ms. If a plurality of vehicles 100 are simultaneously connected to a single key device 110, it may no longer be possible, due to the limited total resources in the key device 110, to maintain the value 215 of 30 ms for each of the individual communication connections 112. Typically, Bluetooth Low Energy, Bluetooth Classic and WiFi share the same resources (e.g. the same antenna) in an electronic device 110. This document describes measures that allow different connection priorities to be defined in order to enable the device 110 to define and/or adjust the values 215 of the connection intervals 212 for the different communication connections 112 based on the different priorities.

This document defines a DCK (Digital Car Key) subevent (i.e. a significance message) 203 in which the vehicle 100 informs the device 110 of the connection priority of the communication connection 112 between the vehicle 100 and the device 110. In this case, the vehicle 100 can change this priority over time (by sending a new significance message 203), e.g. depending on the respectively used and/or controlled vehicle function 103. For example, a higher priority can be defined for remotely controlled parking than for another vehicle function 103.

Thus, a DCK subevent 203 is described, which is sent from a vehicle 100 to the key device 110. For example, the subevent 203 can have the following values: Low prio, medium prio, high prio. For example, the vehicle 100 can specify a high priority in the subevent 203 if a delay-critical function 103 such as RCP (Remote Control Parking) is used. The device 110 can then define a certain temporal length 215 (e.g. 30 ms) of the connection intervals 212 for this connection 112.

It can thus be made possible for a vehicle 100, by sending a significance message 203, to inform the device 110 (which possibly has the status of the "central" of the communication connection 112) about the significance, in particular about the priority, of the communication connection 112, in particular about the significance of the vehicle function 103 which is controlled via the communication connection 112.

The device 110 may be designed to determine the significance of the respective communication connection 112 for a multiplicity of communication connections 112 in each case. Furthermore, the device 110 may be configured to define and, if necessary, to adjust one or more connection parameters, in particular the length 215 of the connection intervals 212, of the individual communication connections 112 depending on the significance of the multiplicity of communication connections 112.

The significance of the individual communication connections 112 can be determined on the basis of the significance messages 203 which were sent by the individual vehicles 100. Alternatively, or additionally, the significance of the individual communication connections 112 can be determined on the basis of a user input by the user of the device 110. For this purpose, the device 110 may have a user interface that allows the user to define the significance of the different communication connections 112.

Figure 3B:
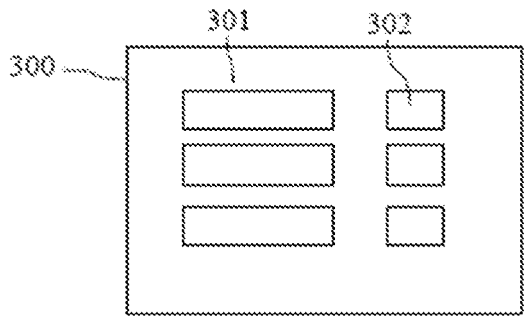
FIG. 3*b* shows an exemplary graphical output for defining the significance values of different communication connections.

FIG. 3*b* shows an exemplary graphical output 300 which can be displayed e.g. on the (touch-sensitive) screen of the device 110. The graphical output 300 comprises a list 301 of vehicles 100 (and/or corresponding communication connections 112) with which the device 110 already communicates or can communicate. For each of the individual vehicles 100, a significance value 302, in particular a priority, can be defined by the user. These significance values 302 can be considered when defining the one or more connection parameters of the (BLE) communication connections 112.

Thus, it is possible to provide an interface between a software application of a key device 110 (for controlling vehicle functions 103) and the DCK framework of the device 110, with the result that the priority required for a particular connection 112 can be communicated to the DCK framework.

For example, if a plurality of vehicles 100 are connected to the key device 110 and the user wants to use a vehicle function 103 on one of the vehicles 100 that requires low-delay communication, the software application (with the user interface for the user) can inform the DCK framework of the device 110 that this connection 112 requires a relatively high priority so that the connection interval 212 for this connection 112 has the lowest possible length value 215.

Figure 4:
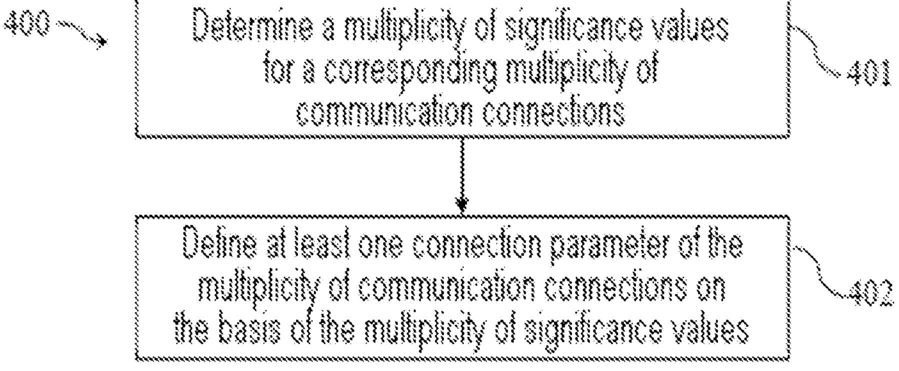
FIG. 4 shows a flowchart of an exemplary method for determining connection parameters of a multiplicity of vehicle communication connections.

FIG. 4 shows a flowchart of an exemplary (possibly computer-implemented) method 400 for determining, in particular for defining, at least one connection parameter of a multiplicity of different communication connections 112 between an electronic (key) device 110 and a corresponding multiplicity of different vehicles 100. The individual communication connections 112 can be used to remotely control at least one vehicle function 103 of the respective vehicle 100. The individual communication connections 112 may have each been established using a digital key 111 (in particular a CCC key). The connection parameter of a communication connection 112 may include, in particular be, the temporal length 215 of the connection intervals 212 of this communication connection 112.

The method 400 comprises determining 401 a multiplicity of significance values 302 for the significance (in particular for the importance and/or for the priority) of the corresponding multiplicity of different communication connections 112. In other words, a significance value 302 can be respectively determined for each communication connection 112 (e.g. on the basis of a user input by a user and/or on the basis of a significance (in particular priority) message 203 which was sent by the individual vehicles 100).

Furthermore, the method 400 comprises determining 402, in particular defining, the connection parameters (in particular the value of the connection parameters) of the multiplicity of different communication connections 112 on the basis of the corresponding multiplicity of significance values 302.

The measures described in this document enable efficient, reliable and convenient remote control of one or more vehicle functions 103 of a multiplicity of different vehicles 100.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The present subject matter is not restricted to the exemplary embodiments shown. In particular, it should be noted that the description and the figures are intended to illustrate the principle of the proposed methods, apparatuses and systems only by way of example.

The foregoing disclosure has been set forth merely to illustrate the present subject matter and is not intended to be limiting. Since modifications of the disclosed embodiments incorporating the spirit and substance of the present subject matter may occur to persons skilled in the art, the present subject matter should be construed to include everything within the scope of the appended claims and equivalents thereof.

What is claimed is:

1. A portable electronic device for determining at least one connection parameter of a multiplicity of different communication connections between an electronic device and a corresponding multiplicity of different vehicles, comprising:

a processor; and a memory in communication with the processor and configured to store instructions executable by the processor to configure the portable electronic device to:

determine a multiplicity of significance values for a significance of the corresponding multiplicity of different communication connections; and define the connection parameters of the multiplicity of different communication connections based on the corresponding multiplicity of significance values;

wherein individual communication connections of the multiplicity of communication connections each include a Bluetooth Low Energy (BLE), communication connection; and wherein the connection parameter comprises a temporal length of connection intervals of the respective BLE communication connection; and wherein the memory further comprises instructions to configure the portable electronic device to determine the temporal length of connection intervals of the multiplicity of BLE communication connections, wherein at least one of:

the temporal length of a first communication connection is shorter than the temporal length of a second communication connection when the multiplicity of significance values indicate a higher significance of the first communication connection than the second communication connection;

the temporal length of a first communication connection is longer than the temporal length of a second communication connection when the multiplicity of significance values indicate a lower significance of the first communication connection than the second communication connection; or the temporal length of connection intervals of the individual communication connections decreases with increasing significance and/or increases with decreasing significance.

2. The portable electronic device according to claim 1, wherein the memory further comprises instructions to configure the portable electronic device to:

receive a significance message sent by a vehicle via a communication connection between the portable electronic device and the vehicle; and determine the significance value for the significance of the communication connection between the portable electronic device and the vehicle based on the significance message.

3. The portable electronic device according to claim 2, wherein the significance message indicates a priority level from a predefined set of different priority levels.

4. The portable electronic device according to claim 1, wherein the memory further comprises instructions to configure the portable electronic device to:

determine the significance value for the significance of the communication connection between the portable electronic device and a vehicle based on a user input on the portable electronic device.

5. The portable electronic device according to claim 1, wherein the portable electronic device has a user interface which allows a user of the portable electronic device to define a significance value for each of the multiplicity of communication connections using a user input; and the memory further comprises instructions to configure the portable electronic device to:

determine the significance values for the significance of the multiplicity of communication connections based on user input on the user interface of the portable electronic device.

6. The portable electronic device according to claim 1, wherein the memory further comprises instructions to configure the portable electronic device to:

determine a vehicle function of a vehicle that is intended to be remotely controlled via the communication connection between the portable electronic device and the vehicle; and determine the significance value for the significance of the communication connection between the portable electronic device and the vehicle based on the vehicle function that is intended to be remotely controlled via the communication connection.

7. The portable electronic device according to claim 6, wherein the memory further comprises instructions to configure the portable electronic device to:

determine the significance value for the significance of the communication connection between the portable electronic device and the vehicle using a significance catalog, wherein the significance catalog indicates a respective corresponding significance value for different vehicle functions.

8. The portable electronic device according to claim 1, wherein the memory further comprises instructions to configure the portable electronic device to:

remotely control one or more vehicle functions of a vehicle via a communication connection between the portable electronic device and the vehicle.

9. The portable electronic device according to claim 1, wherein the significance value for the significance of a communication connection indicates a priority of the communication connection in comparison with one or more other communication connections.

10. The portable electronic device according to claim 1, wherein the memory further comprises instructions to configure the portable electronic device to:

detect an additional communication connection between the portable electronic device and an additional vehicle;

determine a significance value for the significance of the additional communication connection; and based on the multiplicity of significance values for the corresponding multiplicity of communication connections and based on the significance value for the additional communication connection:

adjust the connection parameters of one or more of the multiplicity of different communication connections; and define the connection parameter of the additional communication connection.

11. The portable electronic device according to claim 1, wherein the memory further comprises instructions to configure the portable electronic device to:

identify that at least one of the multiplicity of communication connections no longer exists, resulting in a reduced amount of communication connections and a corresponding reduced amount of significance values; and adjust the connection parameters of one or more of the reduced amount of communication connections based on the corresponding reduced amount of significance values.

12. The portable electronic device according to claim 1, wherein the memory further comprises instructions to configure the portable electronic device to:

repeatedly, at successive times, in each case:

determine an updated multiplicity of significance values; and adjust the connection parameters of one or more of the multiplicity of communication connections based on the updated multiplicity of significance values.

13. The portable electronic device according to claim 1, wherein the memory further comprises instructions to configure the portable electronic device to:

cause the communication connection between the portable electronic device and a vehicle to be established considering a digital key, wherein the digital key is designed according to a Car Connectivity Consortium, CCC, key standard Release 3.

14. A method for determining at least one connection parameter of a multiplicity of different communication connections between an electronic device and a corresponding multiplicity of different vehicles, comprising:

determining a multiplicity of significance values for a significance of the corresponding multiplicity of different communication connections; and defining the connection parameters of the multiplicity of different communication connections based on the corresponding multiplicity of significance values;

wherein individual communication connections of the multiplicity of communication connections each include a Bluetooth Low Energy (BLE), communication connection; and wherein the connection parameter comprises a temporal length of connection intervals of the respective BLE communication connection; and wherein the method further comprises determining the temporal length of connection intervals of the multiplicity of BLE communication connections, wherein at least one of:

the temporal length of a first communication connection is shorter than the temporal length of a second communication connection when the multiplicity of significance values indicate a higher significance of the first communication connection than the second communication connection;

the temporal length of a first communication connection is longer than the temporal length of a second communication connection when the multiplicity of significance values indicate a lower significance of the first communication connection than the second communication connection; or the temporal length of connection intervals of the individual communication connections decreases with increasing significance and/or increases with decreasing significance.

* * * * *